(No Model.)

T. W. WEBB.
ORNAMENTING GLASS.

No. 398,100. Patented Feb. 19, 1889.

Witnesses:
Joseph W. Roe.
C. J. Sundgren.

Inventor:
Thomas Wilkes Webb
By attorneys
Brown & Hall

UNITED STATES PATENT OFFICE.

THOMAS WILKES WEBB, OF STOURBRIDGE, COUNTY OF WORCESTER, ENGLAND.

ORNAMENTING GLASS.

SPECIFICATION forming part of Letters Patent No. 398,100, dated February 19, 1889.

Application filed February 20, 1888. Serial No. 264,591. (No specimens.)

*To all whom it may concern:*

Be it known that I, THOMAS WILKES WEBB, manufacturer, of Stourbridge Glass-Works, Stourbridge, in the county of Worcester, England, have invented certain new and useful Improvements in Ornamenting Glass, of which the following is a specification.

The object of the present invention is to produce a novel and highly-ornamental effect in glass—viz., an imitation of old carved ivory.

Figure 3:
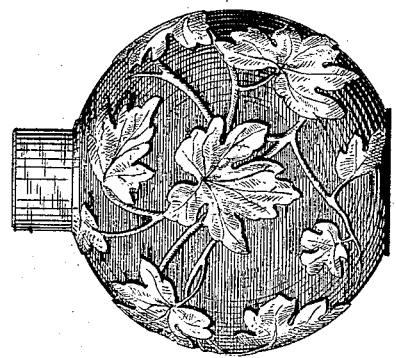
Figure 2:
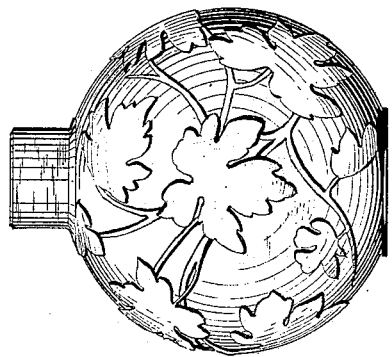
Figure 1:
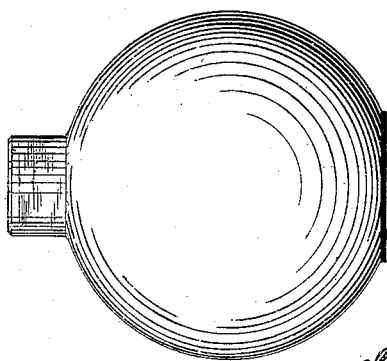

In the accompanying drawings I have shown a vase in the various stages of the process, Figure 1 being an elevation of an opaque glass vase before the process is commenced; Fig. 2, a similar view showing the first stage of the process of ornamentation, and Fig. 3 a similar view showing the process completed.

In carrying out my invention I take any desired form of article—say a vase—of ivory or white opaque glass, (see Fig. 1,) blown on molds or otherwise produced by usual glass-house methods. Upon this vase I produce any desired pattern or design—a branch of the vine, for instance, with its leaves and grapes (see Fig. 2)—to represent the carvings on ivory, in the following manner: The vase is painted or printed upon with an acid-resisting substance and then submerged in hydrofluoric acid, which eats away the surface not so protected and leaves the surface beneath the resist in relief. This eating away of the ground by acid may be supplemented by cutting or engraving with a wheel or otherwise, to give additional prominence or delicacy where required; or in some instances the action of the acid will not be necessary—as, for instance, when it is desired to obtain the effect of sharp or deep carvings. The desired pattern having thus been produced in outline upon the vase, the acid-resist is entirely removed, and the veinings upon the leaves and other marks are produced by the wheel or graver, (see Fig. 3,) the vase being then polished.

The appearance of old carved ivory is produced upon the vase by tinting the same with brown or other suitable color, applying more color in some parts than in others, so as to give the effect of increased prominence to the prominent parts, as well as an aged appearance to the whole. (See Fig. 3.) Thus the markings and the veins of the vine-leaves will receive a dark tint, which is readily applied and retained in the lines, and the prominent parts of the leaves and stem will receive and retain but little color. After tinting, the vase is fired to fix the color in any well-known manner.

The effect produced upon an article of white opaque glass by treating it as above described is very striking and ornamental, and the imitation of old carved ivory is exceedingly close.

Having now described my invention and in what manner the same is to be performed, I claim—

The herein-described process in producing articles in glass in imitation of old carved ivory, consisting in painting or printing the pattern with an acid-resist upon the opaque glass article, then submitting the article to the action of acid to remove the surface of the uncovered portions, then completing the pattern with a cutting-wheel, then tinting the ground and parts of the pattern with glass-color, and fixing the same by firing, substantially as set forth.

THOS. WILKES WEBB.

Witnesses:
LIONEL PEARCE,
    *Coalbournbrook, Stourbridge.*
RICHARD CHEBSEY MOORE,
    *Brook Street, Stourbridge.*